United States Patent [19]
Edwards

[11] 3,933,334
[45] Jan. 20, 1976

[54] BUTTERFLY VALVE SEAT MOLD

[75] Inventor: Robert B. Edwards, Milton Township, Cass County, Mich.

[73] Assignee: Nibco, Inc., Elkhart, Ind.

[22] Filed: Sept. 6, 1974

[21] Appl. No.: 503,799

Related U.S. Application Data

[62] Division of Ser. No. 370,765, June 18, 1973, abandoned.

[52] U.S. Cl. .................. 249/57; 249/88; 249/91
[51] Int. Cl.² .................. B29F 1/022; B29C 1/14
[58] Field of Search ............ 249/57, 63, 64, 87, 88, 249/91; 425/129, 142, 145

[56] References Cited
UNITED STATES PATENTS

| | | | |
|---|---|---|---|
| 3,537,683 | 10/1970 | Snell, Jr. | 249/57 X |
| 3,709,457 | 1/1973 | Church | 425/129 X |

*Primary Examiner*—Francis S. Husar
*Assistant Examiner*—Gus T. Hampilos
*Attorney, Agent, or Firm*—Price, Heneveld, Huizenga & Cooper

[57] ABSTRACT

A valve seat for a butterfly valve having an annular, rigid reinforcement ring embedded in a body of molded elastomeric material. The seat has a pair of diametrically aligned shaft openings for the valve disc supporting and actuating shaft. These holes extend through the elastomeric material and the reinforcement ring and, during molding of the elastomeric material, are occupied by removable cores which center the reinforcement ring about the cores between the end faces of the mold and position it concentrically between the inner and outer circumferential walls of the mold cavity. To prevent the reinforcement ring from rotating about the cores and to center it positively between the end faces of the mold, a pair of aligned pins are provided, one in each of the mold end faces, which clamp the reinforcement ring between them. These pins are located circumferentially along the reinforcement ring approximately halfway between the cores. A second pair of these pins may be used, positioned from the first pair approximately diametrically of the reinforcement ring.

1 Claim, 7 Drawing Figures

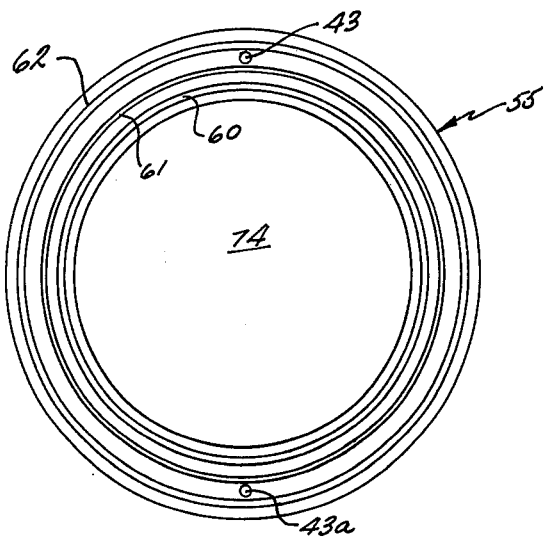
FIG. 4.
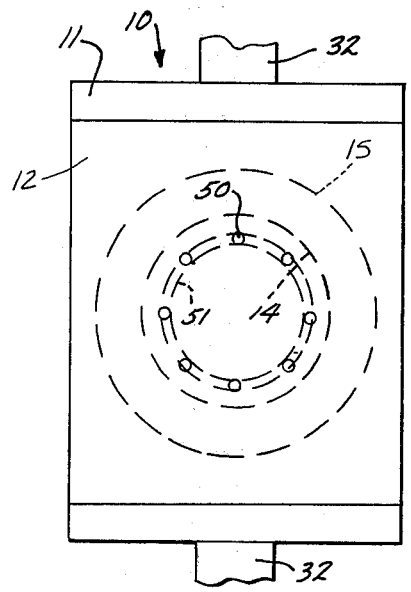
FIG. 3.
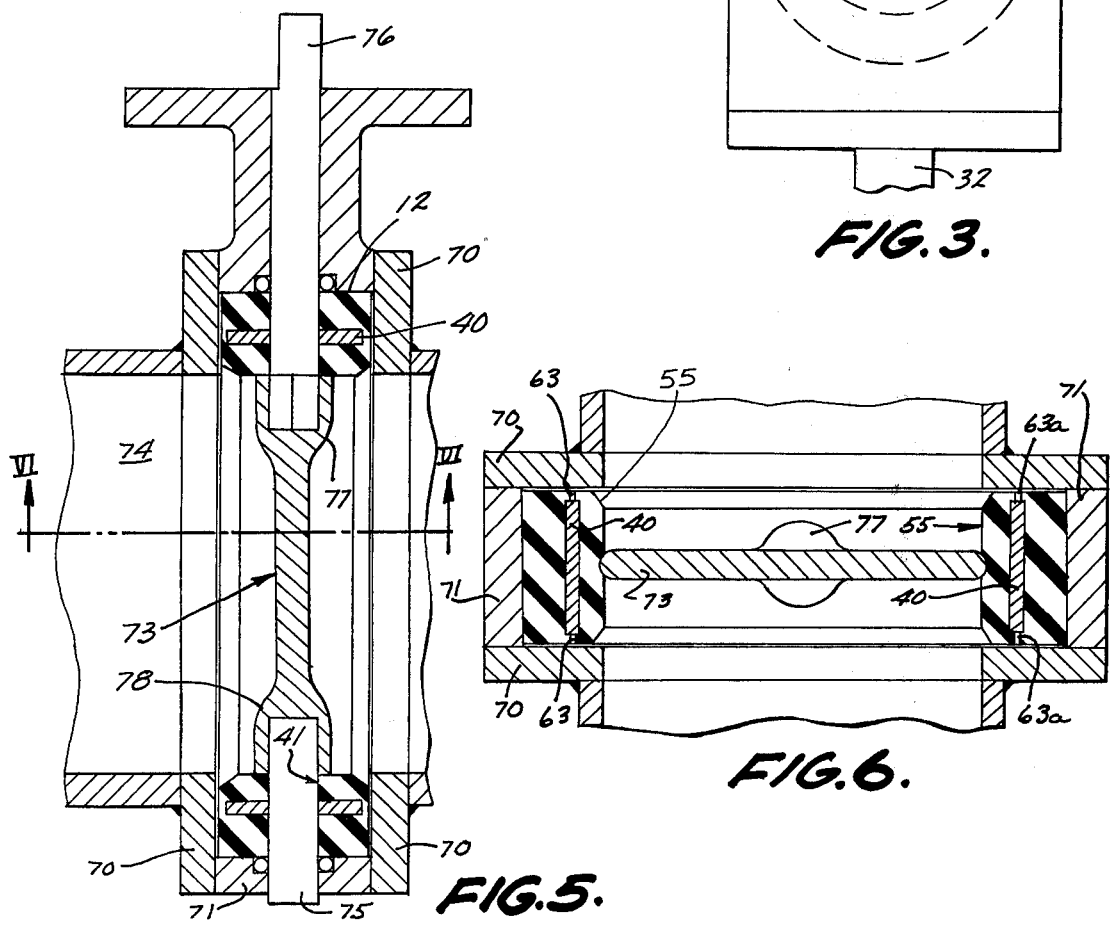
FIG. 5.
FIG. 6.

BUTTERFLY VALVE SEAT MOLD

This is a division of application Ser. No. 370,765 filed June 18, 1973, now abandoned.

This invention relates to butterfly valves and particularly to the elastomeric seat of the valve and to the method and the mold by which the seat is manufactured.

BACKGROUND OF THE INVENTION

Butterfly valves normally consist of a housing or body within which an annular elastomeric seat is mounted for the purpose of effecting a resilient seal against the valve closure member. The valve closure member is a disc which may be rotated from an open position aligned with the direction of flow of a fluid through the valve to a closed position at right angles to the direction of flow. In this latter position, the peripheral edge of the disc tightly engages the valve seat to effect a seal. In the conventional butterfly valve, this seat is molded of an elastomeric material whereby, as the valve's disc is rotated into closed position, the seat has a limited degree of resilience which will permit a seal effecting interference fit between the disc and the seat, providing a fluid tight closure.

The need for a certain degree of resilience and, thus, displacability of the valve seat necessitates the use of an elastomeric material. Materials of this type have a tendency to creep or migrate when subjected to high pressure, particularly when the pressure is applied to the seat on one side of the disc without a corresponding supporting pressure on the other side of the disc. The need to control this migration or creep without sacrifice of the necessary resilience of the elastomeric material has caused the industry to adopt the use of reinforcing members in the seat. These reinforcing members are rigid and provide support for the elastomeric material, limiting its ability to creep or migrate.

One of the more commonly used types of reinforcement is an annular ring or band of rigid material embedded within the seat as the seat is molded. It is important that this reinforcement be accurately positioned within the seat if the seat is to have uniformity of strength and accurate control of deflection, migration and creep is to be maintained. During the actual molding process, the elastomeric material is injected into the mold, at high pressures. These tend to not only deflect but also displace the reinforcement member and, thus, mislocate it within the seat. This results in a defective seat. This invention overcomes this problem.

One proposal for solving this problem is disclosed in U.S. Pat. No. 3,537,683 issued Nov. 3, 1970 to A. H. Snell, Jr., entitled VALVE SEAT FOR A BUTTERFLY VALVE AND METHOD FOR MAKING THE SAME. This solution, however, is not entirely satisfactory. It results in openings in the valve seat which extend from the outer periphery of the valve seat through the reinforcement member, thus, creating a weakness which, as the patent points out, will result in leakage under certain circumstances. If this result is to be avoided, the opening has to be subsequently plugged to prevent the leakage. Even plugging does not overcome the fact that an opening is created through the reinforcement member, thus, permitting differential deflection of the seat at the hole because the plug cannot provide the same uniformity of support as would a continuous, uninterrupted reinforcement member. Further, this solution requires providing two additional holes through the reinforcmeent member before it is placed in the mold. These holes must be accurately indexed both to the holes for the shaft openings and to the locator pins in the mold used to index the reinforcement member during molding. This invention provides a solution to this problem which eliminates the necessity for thus maintaining such accuracy.

This invention has the further advantage of so molding the seat that the holes that result from the reinforcement member indexing pins extend axially into the seat from the ends of the seat terminating at the edge of the reinforcement member. Thus, they are never located beneath the point of sealing contact of the seat and the valve disc when the valve disc is closed. Further, they hold the reinforcement ring by clamping the edges of the ring, thus requiring no modification of the reinforcement ring. Since they are located in the end faces of the sealing member, they can be positioned between the end sealing beads. As so located, they are completely sealed from the entry of fluids which might otherwise enter from either the interior or the exterior of the valve, depending upon whether the valve is being used in a line which is operating under elevated or sub-atmospheric pressures.

SUMMARY OF THE INVENTION

The valve seat of this invention is of the conventional annular type. It is molded in a mold having an annular cavity into which project a pair of removable cores for forming the holes which are later used for the disc supporting and actuating stems. These cores pass through corresponding holes in the reinforcement band or ring. With the mold open, the reinforcement band or ring is placed in the mold and the cores are moved to extended position. In so doing, the cores move through the stem or shaft openings in the ring and appropriately located shoulders on these cores center the ring with respect to the inner and outer walls of the mold. The ring at this point, however, may pivot about the cores and, thus, at a point 90° from the cores can be rotationally displaced toward one or the other of the end faces of the mold. To overcome this, at least one pair of pins are provided in the mold, so located as to engage the edges of the reinforcement ring at approximately 90° from the shaft openings. The pins are aligned and extend, one from each of opposite faces of the mold, and are of such length that when the mold is closed, the pins clamp the reinforcement ring between them and accurately position and lock it midway between the end faces of the mold. When the elastomeric material is injected into the mold, the combination of the cores and the pins stabilizes the reinforcement ring holding it accurately positioned within the mold. When the mold is opened, the pins are withdrawn from the seat leaving only very small, shallow openings extending from the opposite end faces of the seat.

BRIEF DESCRIPTION OF THE DRAWINGS

FIG. 3 is a schematic plan view of a mold suitable for practice of this invention, the view showing the mold closed;

FIG. 4 is an end view of a butterfly valve seat molded according to this invention;

FIG. 5 is a central sectional view of a butterfly valve equipped with a seat incorporating this invention illustrating the valve in closed condition;

FIG. 6 is a sectional view taken along the plane VI—VI of FIG. 5; and

DESCRIPTION OF THE PREFERRED EMBODIMENTS

Figure 1:
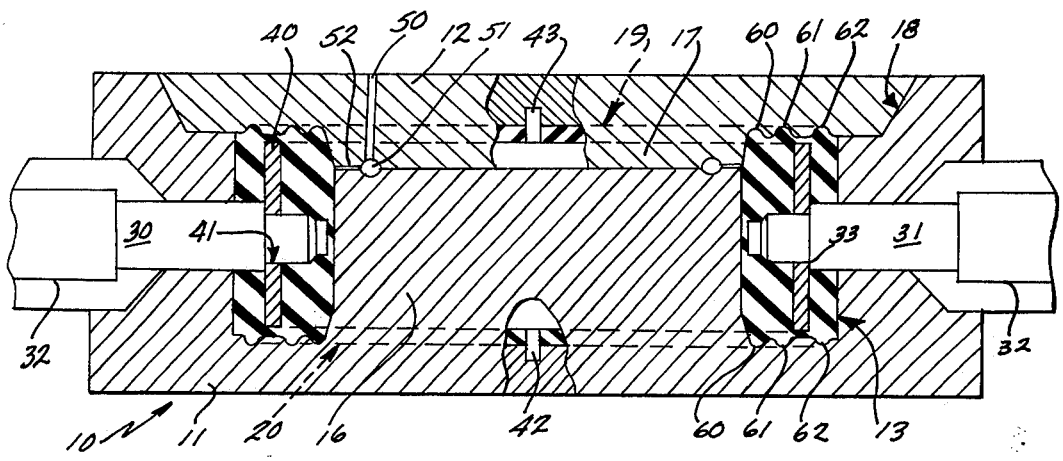
FIG. 1 is a central sectional view of the mold partially broken away to disclose the pins used in the practice of this invention.
Figure 2:
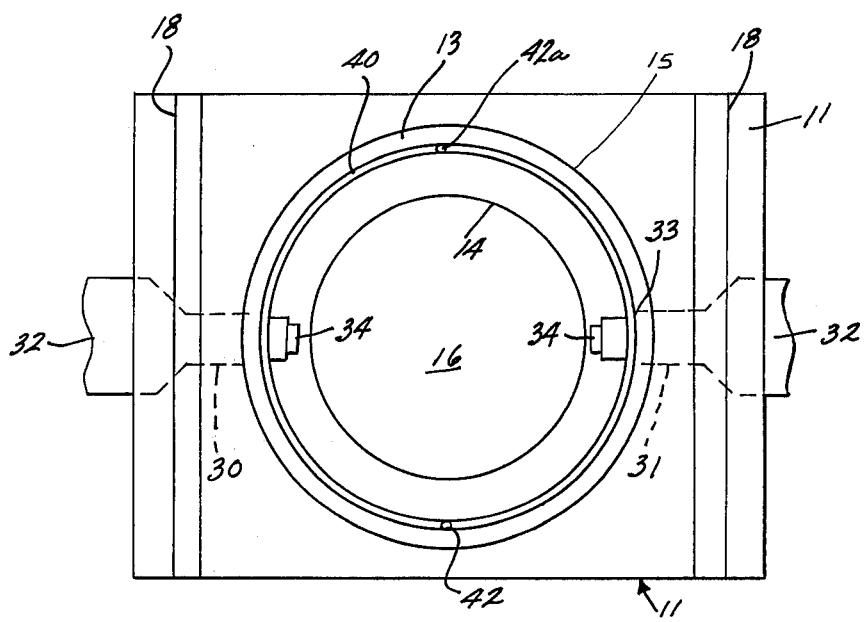
FIG. 2 is a schematic view of the mold illustrating the mold in open conditions with the reinforcement ring seated in the mold as it would be just before the mold is closed.

Referring first to FIG. 1, the numeral 10 refers to a mold having a cavity or female portion 11 and a closure or cover 12. The mold portion 11 has an annular cavity 13 defined by generally concentric inner and outer cavity walls 14 and 15 (FIG. 2). The center of the mold portion 11 is formed by an upstanding boss 16 which matches with a depending boss 17 which is part of the closure member 12. The cavity or lower portion 11 of the mold is separated from the closure member 12 along a parting line 18.

The mold is equipped with a pair of diametrically positioned, reciprocal cores 30 and 31. The cores are actuated to extend and retract by suitable means such as a hydraulic piston and cylinder assembly 32. Since these are conventional, they are illustrated only schematically. It will also be understood that they would normally be provided with a common control for simultaneous operation. This again, is conventional practice and, therefore, is not illustrated. When the cylinder assemblies 32 are actuated to retract the cores 30 and 31, the cores withdraw entirely from the mold cavity 13.

Each of the cores 30 and 31 has a shoulder 33. Projecting beyond the shoulders 33 each of the cores has a stem 34 of such length that when the cores are fully extended, the end of the stems 34 either touch or almost touch the boss 16. For the purpose of this invention, it is irrelevant whether the cores 34 do or do not contact the boss 16 and, in fact, provisions could be made for them to enter a suitable hole in the boss and, thus, pass entirely through the cavity 13. As shown, the stem portions 34 have a step such that the inner ends are of reduced diameter. This again, is not essential to this invention, it being entirely possible to practice the invention with a stem portion of uniform diameter throughout its length. It is, however, important that the diameter of that portion of the stem which passes through the hereinafter described reinforcement ring be such that the opening in the ring fits reasonably closely about the stems.

To initiate the molding of a seat according to this invention, the mold is first opened and then, with the cores 30 and 31 retracted, a reinforcement ring 40 is placed in the mold. The cores 30 and 31 are then extended to operative position. As the cores extend, the stem portions 34 pass through the stem openings 41 in the ring. As illustrated in FIG. 5, the stem openings 41 are centered midway between the ends of the ring and, as shown in FIGS. 1 and 2, are diametrically positioned with respect to the mold cavity. The reinforcement ring 40, as so seated in the mold, is illustrated in FIG. 2. It will be seen that the shoulders 33 on the cores 30 and 31 accurately position the ring concentrically within the mold cavity with respect to the inner and outer cavity walls 14 and 15. Also, since the holes 41 are midway between the edges of the reinforcement ring (FIGS. 1 and 5), the ring, at the cores, is accurately and equally spaced from the end faces 19 and 20 of the mold.

Since the stems 34 and the holes 41 are both circular, the ring without further support, is free to rotate about the stems and, thus, at a point 90° removed from the stems could be tipped toward one or the other of the end faces 19 or 20 of the mold. To prevent this, a pair of pins 42 and 43 are provided (FIG. 1). One end of each of the pins is inserted into a suitable opening in each of the faces of the mold. One pin is embedded into the cavity portion 11 and the other into the closure member 12. The pins project into the mold cavity only that distance necessary for the pins to engage the side edges of the ring 40. Thus, when the mold is closed, the pins clamp the reinforcing ring between them, as illustrated in FIG. 1. When the reinforcement ring 40 is of substantial width, as illustrated in FIG. 1, the projecting portion of the pins is quite short and, thus, the penetration into the mold cavity is minor. If the width of the ring 40 is reduced, the length of the pins has to be correspondingly increased.

The pins 42 and 43 are located approximately 90° from the cores 30 and 31 and are centered circumferentially between the inner and outer faces of the reinforcement ring 40. The pins are not subjected to extremely high loadings and, therefore, can be of small cross section and, in fact, depending upon the wall thickness of the reinforcing ring 40, can have a diameter less than the wall thickness of the reinforcing member. It has been found that pins of 3/32 diameter are quite adequate for this purpose. It is desirable to keep the pins as small as possible so that the resulting openings in the seat after the pins have been removed are so small as to be insignificant.

Figure 7:
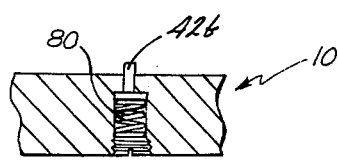
FIG. 7 is a fragmentary, enlarged sectional view of a modified pin construction.

It will be recognized that the pins 42 and 43, when the mold is closed, will accurately stabilize the reinforcement ring 40 so that its edges are parallel to the end faces 19 and 20 of the mold. A single pair of pins is sufficient to accomplish this purpose. However, in many cases, it may be desirable to provide a second and identical pair of pins diametrically opposite from the first pair to provide further stabilization. This is suggested by the pin 42a illustrated in FIG. 2. By providing a second pair of pins, positive support of the reinforcement ring 40 is provided which will prevent the ring from being distorted due to the pressures inherent in the injection of the elastomeric material into the mold. While the projected length of the pins may, in normal production, be such that binding will not occur when maximum width tolerances of the reinforcement ring are encountered, it will be recognized that if a closer fit between the pins and the ring is desired, one or more of the pins 42 or 43 can be resiliently mounted so that one or the other or both of the pins can be forced to retract slightly to accommodate rings having a width exceeding normal tolerances. Such an arrangement is shown in the modification illustrated in FIG. 7 where the pin 42b is supported by a spring 80. This feature could be applied to all of the pins. For all normal usage, however, the gap which will occur when the ring is of minimal width within tolerance limits with the pins of a height to function with a ring of maximum tolerance will be entirely functional for the purpose of this invention.

With the reinforcement ring 40 positioned as indicated in FIG. 2 in the mold, the cover or closure member 12 is installed, thus, clamping the ring between the pins. Suitable means are provided for locking the closure member to the cavity portion of the mold. These are not shown since they are entirely conventional. The elastomeric material is then injected into the mold through one or more of the gates 50 (FIGS. 1 and 3). The elastomeric material under pressure is then caused to migrate along the distribution channel 51 and enter the mold through the gap 52. This gap is as thin as possible and may be no more than 0.015 of an inch. The narrower the gap 52, the thinner the web of flash left on the final product when the seat is removed from the mold. After the mold has been filled with the elastomeric material and this material has set, the cores 30 and 31 are retracted, the closure member 12 removed and the seat 55 taken out of the mold. To facilitate removal of the seat from the mold, suitable ejectors or knockout pins are provided. These are not illustrated since their use is conventional and well-known in the art.

It will be noted that the end faces of the seat are provided with axially extending, concentric beads 60, 61 and 62. The provision of beads of this type on the axial faces of a butterfly valve seal is conventional. However, by so arranging them that the area of the axial face which overlies the edge of the reinforcement ring 40 is positioned between a pair of the beads is a facet of this invention. By so spacing beads 61 and 62 that the pins 42 and 43 are located between them (FIG. 4), it is possible to isolate the openings 63 left by the pins 42 and 43 from both the outer and inner portions of the seal. As is well-known in the butterfly art, these beads are pressed tightly against the flanges 70 of the pipe ends between which the butterfly valve is installed (FIG. 5). By tightening the conventional bolts provided for pulling the flanges together and clamping the butterfly valve in place, these beads are deformed and so tightly pressed against these flanges as to form a tight, leakproof seal against the migration of fluids, either liquids or gases, between the seal and the flanges. By locating the holes 63 between the beads 61 and 62, these holes are thus sealed off from entry of fluids either from the interior or the exterior of the valve. The same is true whether a single pair or a double pair of the openings exist in the seat.

The assembled valve is illustrated in FIG. 5. The seat 55 is seated within a housing or valve body 71. In the case of the seat illustrated in this embodiment, the seat is installed by sliding it endwise into the valve body bore 72. The valve disc 73 is then placed in the center fluid passage 74 of the seat and secured by installation of the stub shaft 75 and main shaft 76. The ends of these shafts seat in the bosses 77 and 78 of the discs 73. A nonrotatable engagement is provided by the boss 77 between the valve disc and the main shaft 76. All of this is conventional in butterfly valve construction. It will be recognized that the seat may be of the type which interlocks with the housing without departing from the teachings of this invention.

FIGS. 5 and 6 illustrate the valve in closed position. FIG. 6 shows that the seal forming engagement between the valve disc 73 and the seat 55 is substantially spaced from the pin openings 63. Thus, no matter how much deflection pressure is exerted on the seat by the valve disc or fluid pressure differential across the point of seal, there is no possibility of the pin openings weakening the seat to impair the seal. The reinforcement ring remains in tact to fully and uniformly support the elastomeric material of the seat in the area of seat-valve engagement.

When the seat is designed with the outer axial portions of the fluid passageway 74 through the seat flared slightly, radially outwardly, the seat in the area which is radially aligned with the openings 63 or 63a does not even make contact with the disc 73 as it is opened and closed.

It will be recognized that this invention may be used irrespective of the type of elastomeric material used in the molding of the seat. The invention, thus, has the advantage of being versatile in its application. Further, the invention does not require any particular shaping or secondary operations on the reinforcement ring 40, thus again, not only reducing the cost of manufacturing the seat but also giving the invention the benefit of versatility in application. Another advantage is the fact that the invention is not dependent upon either the wall thickness or the particular material used for the reinforcement ring. Reinforcement rings of a wide variety of designs can be used with this invention. The invention has the advantage of positively and dependably locking the ring in a predetermined stable position in the mold without the operator having to take any particular precautions when the ring is placed in the mold. This substantially reduces manufacturing costs. Further, it positively and dependably holds the ring in this position throughout the molding procedure, thus, eliminating the problem of costly rejects.

These and other advantages of this invention will be readily understood by those skilled in the art of butterfly valves. They will recognize that the invention is useful whether the seat is fabricated as one to be retained as a separate component and, thus, axially slidable in and out of the valve body or housing or the seat is one which is molded within the housing and, thus, permanently bonded to it. It will be recognized that the invention may be used with reinforcement rings of various widths and that the same advantages of uniform and complete support for the seat along the line of disc contact when the valve is closed will be obtained with this invention, irrespective of whether the disc is centered about the shafts 75 and 76 or is eccentric of them as some valves are constructed. The invention has the further advantage of being capable of being used in existing molds by the minor modification of installation of the pins 42 and 43. Thus, it will be recognized that the design of the reinforcement member and the overall design of the seat and of the valve may be varied widely without departing from the principles of this invention.

The embodiment of the invention in which an exclusive property or privilege is claimed are defined as follows:

1. A mold for making the annular resilient disc seat for a butterfly valve which seat has a plurality of axially projecting, concentric, circular beads on each of its axial side faces and a rigid reinforcement ring embedded within the elastomeric body of the seat, the ring having a pair of diametrically positioned holes, said mold having an annular cavity defined by a pair of concentric inner and outer walls and a pair of end faces spaced apart corresponding to the axial thickness of the seat to be molded therein, said mold having concentric circular channels for forming said beads on said ring; said mold having means projecting into the mold cavity radially thereof for forming a pair of diametrically opposed openings in the seat for the disc supporting shafts and extending through the openings in the ring for supporting said ring in spaced relationship to both of said faces, said mold characterized by a pair of pins projecting into said mold cavity, said pins being aligned and extending toward each other from opposite ones of said faces of said mold, the inner end of each of said pins extending an equal distance from its adjacent end face, said inner ends being spaced apart a distance equal to the width of said reinforcement ring; said pins being located approximately midway between said projecting means circumferentially of the mold cavity and between a pair of said channels whereby the resulting openings in the ring will be between a pair of said beads; said pins having a cross-sectional size no greater than the wall thickness of the reinforcing ring.

* * * * *